(12) United States Patent
Sun et al.

(10) Patent No.: US 9,759,954 B2
(45) Date of Patent: Sep. 12, 2017

(54) DISPLAY PANEL AND DISPLAY DEVICE

(71) Applicant: Wuhan China Star Optoelectronics Technology Co., Ltd., Wuhan, Hubei (CN)

(72) Inventors: Haiyan Sun, Guangdong (CN); De-Jiun Li, Guangdong (CN); Haibo Peng, Guangdong (CN); Hongqing Cui, Guangdong (CN)

(73) Assignee: WUHAN CHINA STAR OPTOELECTRONICE TECHNOLOGY CO., LTD, Wuhan, Hubei (CN)

( * ) Notice: Subject to any disclaimer, the term of this patent is extended or adjusted under 35 U.S.C. 154(b) by 198 days.

(21) Appl. No.: 14/655,393

(22) PCT Filed: May 22, 2015

(86) PCT No.: PCT/CN2015/079562
§ 371 (c)(1),
(2) Date: Jun. 25, 2015

(87) PCT Pub. No.: WO2016/173021
PCT Pub. Date: Nov. 3, 2016

(65) Prior Publication Data
US 2017/0146833 A1  May 25, 2017

(30) Foreign Application Priority Data

Apr. 30, 2015 (CN) .......................... 2015 1 0222699

(51) Int. Cl.
*G02F 1/1339* (2006.01)
*G02F 1/1341* (2006.01)

(52) U.S. Cl.
CPC .......... *G02F 1/1339* (2013.01); *G02F 1/1341* (2013.01); *G02F 1/13394* (2013.01); *G02F 2001/13398* (2013.01)

(58) Field of Classification Search
CPC ............... G02F 1/13394; G02F 1/1339; G02F 1/13392; G02F 1/1341; G02F 1/161;
(Continued)

(56) References Cited

U.S. PATENT DOCUMENTS

2002/0060770 A1* 5/2002 Chung ................ G02F 1/13394
349/153
2012/0327347 A1* 12/2012 Cho ...................... G02F 1/1339
349/138
2014/0049157 A1 2/2014 Kim et al.

FOREIGN PATENT DOCUMENTS

CN 101441349 A 5/2009
CN 103454813 A 12/2013
(Continued)

*Primary Examiner* — Thoi Duong
(74) *Attorney, Agent, or Firm* — Andrew C. Cheng

(57) ABSTRACT

A display panel and a display device are disclosed. The display panel includes: a first substrate, including a first sealant coating area, wherein the first sealant coating area is provided with a first concave slot; a second substrate, disposed oppositely to the first substrate, and including a second sealant coating area disposed right oppositely to the first sealant coating area; a spacer, the spacer having two terminals, wherein, one terminal of the spacer is fixed to and connected with a bottom of the first concave slot, and the other terminal of the spacer is extended toward the second sealant coating area; and a frame sealant, filled between the first sealant coating area and the second sealant coating area in order to form a sealed liquid crystal filling area. The display panel of the present invention can effectively increase the bonding force of the frame sealant to the substrates.

15 Claims, 3 Drawing Sheets

(58) Field of Classification Search
CPC .............. G02F 1/0107; G02F 1/1333; G02F 2001/1339; G02F 2001/1341; G02F 2001/13415; G02F 2201/40
USPC .................... 349/153, 155, 190, 156, 158
See application file for complete search history.

(56) References Cited

FOREIGN PATENT DOCUMENTS

| | | |
|---|---|---|
| CN | 103576390 A | 2/2014 |
| CN | 204241807 U | 4/2015 |

* cited by examiner

DISPLAY PANEL AND DISPLAY DEVICE

BACKGROUND OF THE INVENTION

1. Field of the Invention

The present invention relates to a liquid crystal display field, and more particular to a display panel and a display device.

2. Description of Related Art

Comparing to a conventional liquid crystal panel, a liquid crystal panel using a color filter on array (COA) technology can increased the aperture ratio of the liquid crystal panel and increase the brightness of the liquid crystal panel because a color filter substrate is integrated on an array substrate and the problem of not strictly aligned for color filter units and pixel units is not existed. Currently, a narrow-frame design is applied on that panel in order to further increase the display level.

The key for narrowing a frame of the liquid crystal panel is to narrow a frame sealant. However, when the frame sealant is narrowed, a contact area between the color filter substrate and the array substrate is also decreased so that a bonding force of the frame sealant to the substrates is decreased such that undesirable phenomenon of liquid crystal molecules leakage of a liquid crystal cell and an opened liquid crystal cell may be generated. Accordingly, how to increase the bonding force of a frame sealant to substrates in order to realize a narrow-frame design of a liquid crystal panel an urgent problem.

SUMMARY OF THE INVENTION

The main technology problems solved by the present invention are to provide a display panel and a display device which can effectively improve the bonding force of the frame sealant.

In order to solve the above technology problem, a technology solution adopted by the present invention is: providing a display panel, comprising: a first substrate, including a first sealant coating area, wherein the first sealant coating area is provided with a first concave slot; a second substrate, disposed oppositely to the first substrate, and including a second sealant coating area disposed right oppositely to the first sealant coating area; a spacer, the spacer having two terminals, wherein, one terminal of the spacer is fixed to and connected with a bottom of the first concave slot, and the other terminal of the spacer is extended toward the second sealant coating area; and a frame sealant, filling between the first sealant coating area and the second sealant coating area in order to form a sealed liquid crystal filling area; wherein, the first concave slot is continuously or discontinuously disposed on the first sealant coating area; a width of the first concave slot is smaller than a width of the first sealant coating area; the first sealant coating area is rectangular, frame-shaped and including four coating regions connected with each other; each coating region is provided with the spacer; the spacer is made of a photoresist material, and is formed on the first substrate by steps of developing, exposing and etching.

In order to solve the above technology problem, another technology solution adopted by the present invention is: providing a display panel, comprising: a first substrate, including a first sealant coating area, wherein the first sealant coating area is provided with a first concave slot; a second substrate, disposed oppositely to the first substrate, and including a second sealant coating area disposed right oppositely to the first sealant coating area; a spacer, the spacer having two terminals, wherein, one terminal of the spacer is fixed to and connected with a bottom of the first concave slot, and the other terminal of the spacer is extended toward the second sealant coating area; and a frame sealant, filling between the first sealant coating area and the second sealant coating area in order to form a sealed liquid crystal filling area.

In order to solve the above technology problem, another technology solution adopted by the present invention is: providing a display device, comprising: a display panel including: a first substrate, including a first sealant coating area, wherein the first sealant coating area is provided with a first concave slot; a second substrate, disposed oppositely to the first substrate, and including a second sealant coating area disposed right oppositely to the first sealant coating area; a spacer, the spacer having two terminals, wherein, one terminal of the spacer is fixed to and connected with a bottom of the first concave slot, and the other terminal of the spacer is extended toward the second sealant coating area; and a frame sealant, filling between the first sealant coating area and the second sealant coating area in order to form a sealed liquid crystal filling area.

Wherein, the first concave slot is continuously or discontinuously disposed on the first sealant coating area, and a width of the first concave slot is smaller than a width of the first sealant coating area.

Wherein, the second sealant coating area is provided with a second concave slot; the second concave slot is continuously or discontinuously disposed on the second sealant coating area; a width of the second concave slot is smaller than a width of the second sealant coating area.

Wherein, the other terminal of the spacer is extended toward and inside the second concave slot.

Wherein, a preset gap is existed between the spacer and the second substrate.

Wherein, the other terminal of the spacer has a concave and convex structure.

Wherein, the first sealant coating area is rectangular, frame-shaped and including four coating regions connected with each other; each coating region is provided with the spacer.

Wherein, each coating region is provided with multiple spacers.

Wherein, the spacer is made of a photoresist material, and is formed on the first substrate by steps of developing, exposing and etching.

The beneficial effects of the present invention is: comparing to the conventional art, the display panel of the present invention provides a first concave slot at a first sealant coating area of the first substrate, and provides multiple spacers which are fixed to and connected with the bottom of the first concave slot so that the frame sealant is not only contacted with the first substrate and the second substrate, but also contacted with the spacers fixed to the first substrate in order to increase a contact area of the frame sealant. Therefore, the bonding force of the frame sealant to the substrate is effectively increased. Furthermore, the spacers disposed at the sealant coating area provide an auxiliary supporting function for the first substrate and the second substrate so as to prevent a thickness of the liquid crystal cell from changing.

DETAILED DESCRIPTION OF THE PREFERRED EMBODIMENT

The following content combines figures and embodiments for detail description of the present invention.

The present invention provides a display panel. The display panel includes a first substrate, a second substrate, spacers, and a frame sealant. Wherein, the first substrate includes a first sealant coating area, and the first sealant coating area is provided with a first concave slot. The second substrate is disposed oppositely to the first substrate, and including a second sealant coating area disposed right oppositely to the first sealant coating area. Each spacer having two terminals, wherein, one terminal of the spacer is fixed to and connected with a bottom of the first concave slot, and the other terminal of the spacer is extended toward the second sealant coating area. The frame sealant is filled between the first sealant coating area and the second sealant coating area in order to form a sealed liquid crystal filling area.

Embodiment 1

Figure 1:
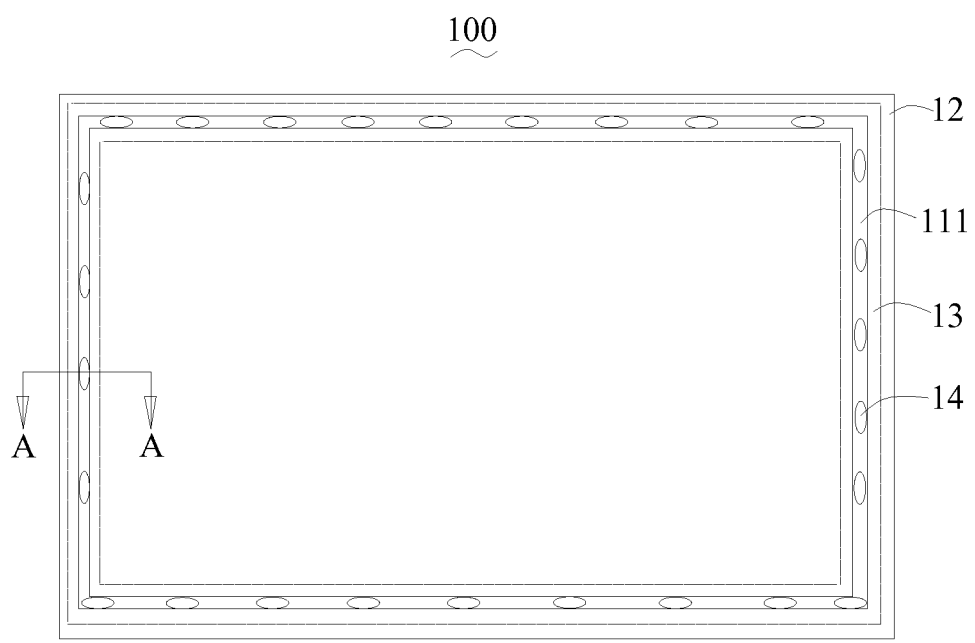
FIG. 1 is a schematic top view of a first embodiment of a display panel of the present invention.
Figure 2:
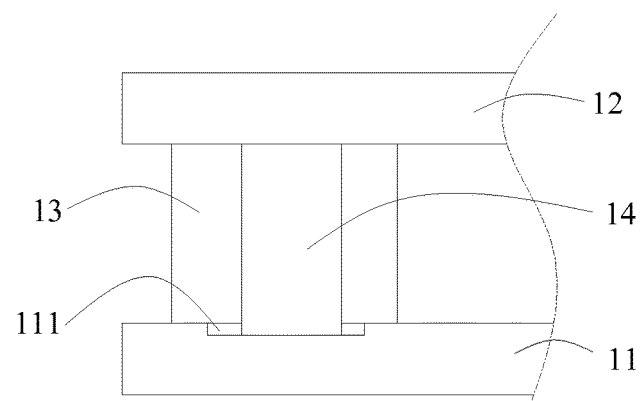
FIG. 2 is a schematic partial cross-sectional view at A-A direction shown in FIG. 1.

With reference to FIG. 1, FIG. 1 is a schematic top view of a first embodiment of a display panel of the present invention, and FIG. 2 is a schematic partial cross-sectional view at A-A direction shown in FIG. 1. In the present embodiment, a display panel 100 includes a first substrate 11, a second substrate 12, a frame sealant 13, and multiple spacers 14.

A first sealant coating area (not shown) is disposed on the first substrate 11. The second substrate 12 is disposed oppositely to the first substrate 11, and a second sealant coating area (not shown) is disposed on the second substrate 12 and right oppositely to the first sealant coating area. The first substrate 11 and the second substrate 12 are similar in shape and equal in area. The first sealant coating area and the second sealant coating area are similar in shape and equal in area.

In the present embodiment, the first sealant coating area is rectangular, frame-shaped, and including four coating regions connected with each other. The first sealant coating area is provided with a concave slot 111. The concave slot 111 is also rectangular, frame-shaped, and formed continuously. Preferably, a width of the concave slot 111 is smaller than a width of the first sealant coating area. In another embodiment, multiple concave slots 111 may also be disposed discontinuously along a length direction of the four coating regions connected with each other on the first sealant coating area.

A terminal of each spacer 14 is fixed to and connected with a bottom of the concave slot 111. Preferably, each spacer 14 is made of a photoresist material, and is formed in the concave slot 111 of the first substrate 11 by steps of developing, exposing, etching, and so on such that the spacer 14 is fixed to and connected with the first substrate 11. The spacer 14 fixed to and connected with the concave slot 111 can also protect metal lines below the concave slot 111.

In the present embodiment, the concave slots 111 located at the four coating regions of the first sealant area are all provided with spacers 14. Furthermore, the concave slot 111 located at each coating region provides with multiple spacers 14. Besides, preferably, a concave slot 111 located at an intersection location of two coating regions is provided with a spacer 14. In the present embodiment, another terminal of the spacer 14 is contacted with a surface of the second substrate 12.

The frame sealant 14 is filled between the first sealant coating area and the second sealant coating area in order to connect the first substrate 11 and the second substrate 12, and form a sealed liquid crystal filling area between the first substrate 11 and the second substrate 12.

The disposition of the spacers 14 can make a contact area of the frame sealant 13 to be increased so as to effectively strengthen the reliability of the narrow-frame design of the display panel.

Embodiment 2

Figure 3:
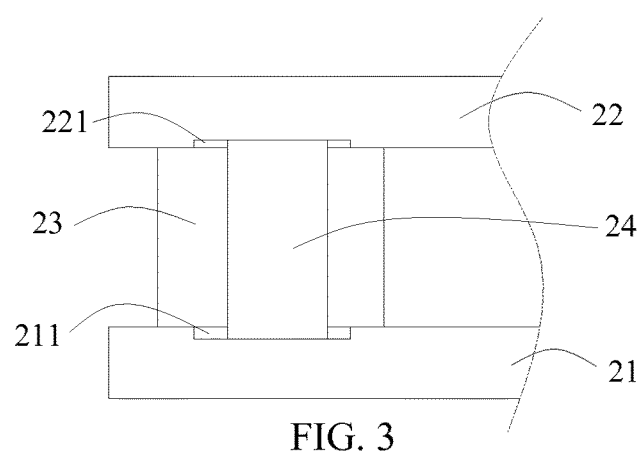
FIG. 3 is a schematic partial cross-sectional view of a second embodiment of a display panel of the present invention.

With further reference to FIG. 3, FIG. 3 is a schematic partial cross-sectional view of a second embodiment of a display panel of the present invention. In the present embodiment, a display panel includes a first substrate 21, a second substrate 22, a frame sealant 23, and multiple spacers 24.

A first sealant coating area (not shown) is disposed on the first substrate 21. The second substrate 22 is disposed oppositely to the first substrate 21, and a second sealant coating area (not shown) is disposed on the second substrate 22 and right oppositely to the first sealant coating area. The first substrate 21 and the second substrate 22 are similar in shape and equal in area. The first sealant coating area and the second sealant coating area are similar in shape and equal in area.

In the present embodiment, the first sealant coating area is rectangular, frame-shaped, and including four coating regions (not shown) connected with each other. The first sealant coating area is provided with a concave slot 211. The concave slot 211 is also rectangular, frame-shaped, and formed continuously. Preferably, a width of the concave slot 211 is smaller than a width of the first sealant coating area. In another embodiment, multiple concave slots 211 may also be disposed discontinuously along a length direction of the four coating regions connected with each other on the first sealant coating area.

The second sealant coating area is provided with a concave slot 221. The concave slot 221 is rectangular and frame-shaped, and formed continuously. Or, multiple concave slots 221 may also be disposed discontinuously along a length direction of the four coating regions connected with each other on the second sealant coating area.

A terminal of each spacer 24 is fixed to and connected with a bottom of the concave slot 211. Preferably, each spacer 24 is made of a photoresist material, and is formed in the concave slot 211 of the first substrate 21 by steps of developing, exposing, etching, and so on such that the spacer 24 is fixed to and connected with the first substrate 21. The spacer 24 fixed to and connected with the concave slot 211 can also protect metal lines below the concave slot 211.

In the present embodiment, the concave slots 211 located at the four coating regions of the first sealant area are all provided with a spacer 24. Furthermore, the concave slot 211 located at each coating region provides with multiple spacers 24. Besides, preferably, a concave slot 211 located at an intersection location of two coating regions is provided with a spacer 24. In the present embodiment, another terminal of the spacer 24 is extended to a concave slot 221 of the second substrate 22 and is contacted with a bottom of the concave slot 221.

In another embodiment, a portion of the spacer 24 is fixed to and connected with the concave slot 211, and another portion of the spacer 24 is fixed to and connected with the concave slot 221. In other words, the portion of the spacer 24 is disposed in the concave slot 211, and the another portion of the spacer 24 is disposed in the concave slot 221. Preferably, the spacers 24 can be disposed in the concave slot 211 and the concave slot 221 at intervals by an interleaved way. Specifically, a portion of each spacer 24 is formed in the concave slot 211 through steps of developing, exposing, and etching, and so on such that the portion of the spacers 24 is fixed and connected with the first substrate 21. Another portion of each spacer 24 is made of a photoresist material, and formed by steps of developing, exposing, etching, and so on such that the another portion of each spacer 24 is fixed to and connected with the second substrate 22. When the first substrate 21 and the second substrate 22 are aligned to form a liquid crystal cell, two spacers adjacent to each spacer 24 fixed to and connected with the first substrate 21 are fixed to and connected with the second substrate 22, and two spacers adjacent to each spacer 24 fixed to and connected with the second substrate 22 are fixed to and connected with the first substrate 21.

The frame sealant 24 is filled between the first sealant coating area and the second sealant coating area in order to connect the first substrate 21 and the second substrate 22, and form a sealed liquid crystal filling area between the first substrate 21 and the second substrate 22.

The disposition of the spacers 24 can make a contact area of the frame sealant 23 to be increased so as to effectively strengthen the reliability of the narrow-frame design of the display panel.

Embodiment 3

Figure 4:
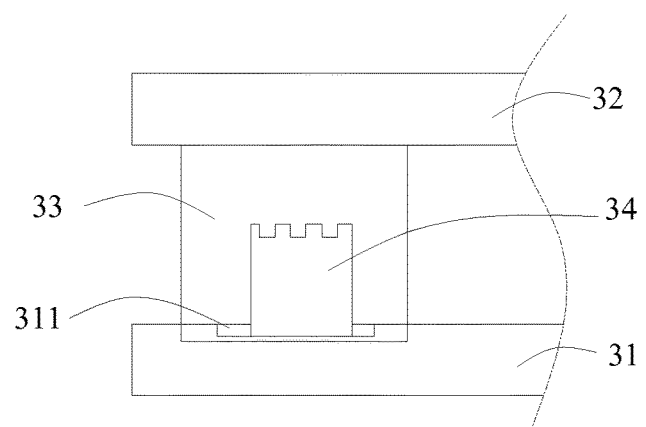
FIG. 4 is a schematic partial cross-sectional view of a third embodiment of a display panel of the present invention.

With reference to FIG. 4, FIG. 4 is a schematic partial cross-sectional view of a third embodiment of a display panel of the present invention. In the present embodiment, the display panel includes a first substrate 31, a second substrate 32, a frame sealant 33, and multiple spacers 34.

A first sealant coating area (not shown) is disposed on the first substrate 31. The second substrate 32 is disposed oppositely to the first substrate 31, and a second sealant coating area (not shown) is disposed on the second substrate 32 and right oppositely to the first sealant coating area. The first substrate 31 and the second substrate 32 are similar in shape and equal in area. The first sealant coating area and the second sealant coating area are similar in shape and equal in area.

In the present embodiment, the first sealant coating area is rectangular, frame-shaped, and including four coating regions connected with each other. The first sealant coating area is provided with a concave slot 311. The concave slot 311 is also rectangular, frame-shaped, and formed continuously. Preferably, a width of the concave slot 311 is smaller than a width of the first sealant coating area. In another embodiment, multiple concave slots 311 may also be disposed discontinuously along a length direction of the four coating regions connected with each other on the first sealant coating area.

A terminal of each spacer 34 is fixed to and connected with a bottom of the concave slot 311. Preferably, each spacer 34 is made of a photoresist material, and is formed in the concave slot 311 of the first substrate 31 by steps of developing, exposing, etching, and so on such that the spacers 34 is fixed to and connected with the first substrate 31. The spacers 34 fixed to and connected with the concave slot 311 can also protect metal lines below the concave slot 311.

In the present embodiment, the concave slots 311 located at the four coating regions of the first sealant area are respectively provided with a spacer 34. Furthermore, the concave slot 311 located at each coating region is provided with multiple spacers 34. In the present embodiment, a preset gap is existed between another terminal of the spacer 34 and the second substrate 32, and the another terminal of the spacer 34 has a concave and convex structure.

The frame sealant 34 is filled between the first sealant coating area and the second sealant coating area in order to connect the first substrate 31 and the second substrate 32, and form a sealed liquid crystal filling area between the first substrate 31 and the second substrate 32.

The disposition of the spacers 34 can make a contact area of the frame sealant 33 to be increased so as to effectively strengthen the reliability of the narrow-frame design of the display panel. The concave and convex structure of the other terminal of the spacer 34 further increases the contact area of the frame sealant 33.

Embodiment 4

Figure 5:
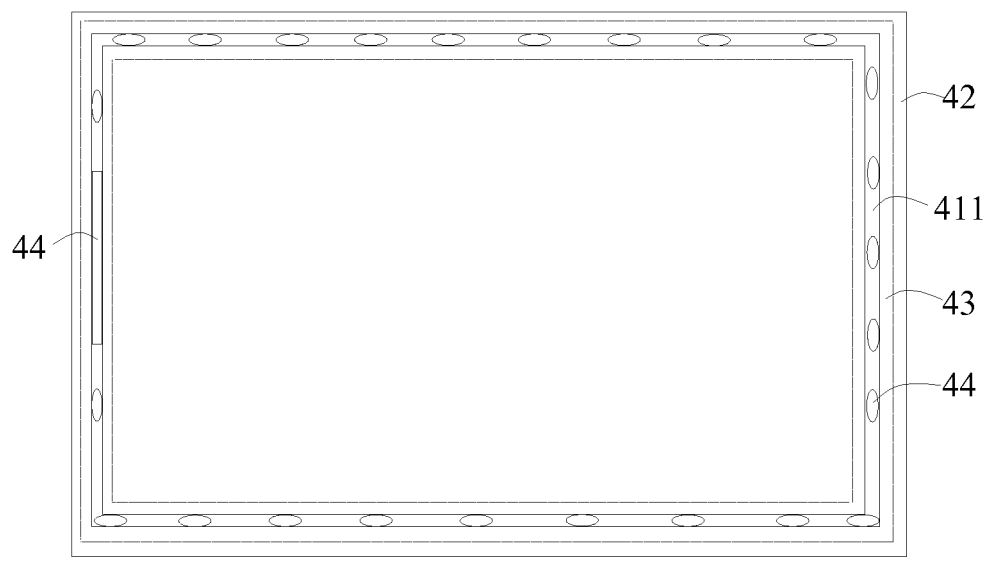
FIG. 5 is a schematic top view of a fourth embodiment of a display panel of the present invention.

With reference to FIG. 5, FIG. 5 is a schematic top view of a fourth embodiment of a display panel of the present invention. In the present embodiment, the display panel includes a first substrate, a second substrate 42, a frame sealant 43, and multiple spacers 44. The first substrate is provided with a concave slot 411.

The structure of the first substrate and the second substrate can refer to the embodiment 1 to the embodiment 3 described above. In the present embodiment, the structure of the multiple spacers 44 can be divided into two types. From the top view, the spacer may be a columnar body having an elliptical cross section or a columnar body having a rectangular cross section.

Comparing to the conventional art, the display panel of the present invention provides a first concave slot at a first sealant coating area of the first substrate, and provides multiple spacers which are fixed to and connected with the bottom of the first concave slot so that the frame sealant is not only contacted with the first substrate and the second substrate, but also contacted with the spacers fixed to the first substrate in order to increase a contact area of the frame sealant. Therefore, the bonding force of the frame sealant to the substrate is effectively increased. Furthermore, the spacers disposed at the sealant coating area provide an auxiliary supporting function for the first substrate and the second substrate so as to prevent a thickness of the liquid crystal cell from changing. The present invention is suitable for a narrow frame display panel, and can effectively increase the bonding force between the two substrate of the narrow frame display panel.

The present invention further provides a display device, and the display device includes one of the display panel described at above embodiment.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display panel, comprising:
    a first substrate, including a first sealant coating area, wherein the first sealant coating area is provided with a first concave slot;
    a second substrate, disposed oppositely to the first substrate, and including a second sealant coating area disposed right oppositely to the first sealant coating area;
    a spacer, the spacer having two terminals, wherein, one terminal of the spacer is fixed to and connected with a bottom of the first concave slot, and the other terminal of the spacer is extended toward the second sealant coating area; and
    a frame sealant, filled between the first sealant coating area and the second sealant coating area in order to form a sealed liquid crystal filling area;
    wherein, the first concave slot is continuously or discontinuously disposed on the first sealant coating area; a width of the first concave slot is smaller than a width of the first sealant coating area; the first sealant coating area is rectangular, frame-shaped and including four coating regions connected with each other; each coating region is provided with the spacer; the spacer is made of a photoresist material, and is formed on the first substrate by steps of developing, exposing and etching;
    wherein, a preset gap is existed between the spacer and the second substrate; and
    wherein, the other terminal of the spacer has a concave and convex structure.

2. The display panel according to claim 1, wherein, the second sealant coating area is provided with a second concave slot; the second concave slot is continuously or discontinuously disposed on the second sealant coating area; a width of the second concave slot is smaller than a width of the second sealant coating area.

3. The display panel according to claim 2, wherein, the other terminal of the spacer is extended toward and inside the second concave slot.

4. A display panel, comprising:
    a first substrate, including a first sealant coating area, wherein the first sealant coating area is provided with a first concave slot;
    a second substrate, disposed oppositely to the first substrate, and including a second sealant coating area disposed right oppositely to the first sealant coating area;
    a spacer, the spacer having two terminals, wherein, one terminal of the spacer is fixed to and connected with a bottom of the first concave slot, and the other terminal of the spacer is extended toward the second sealant coating area; and
    a frame sealant, filled between the first sealant coating area and the second sealant coating area in order to form a sealed liquid crystal filling area;
    wherein, a preset gap is existed between the spacer and the second substrate; and
    wherein, the other terminal of the spacer has a concave and convex structure.

5. The display panel according to claim 4, wherein, the first concave slot is continuously or discontinuously disposed on the first sealant coating area, and a width of the first concave slot is smaller than a width of the first sealant coating area.

6. The display panel according to claim 5, wherein, the second sealant coating area is provided with a second concave slot; the second concave slot is continuously or discontinuously disposed on the second sealant coating area; a width of the second concave slot is smaller than a width of the second sealant coating area.

7. The display panel according to claim 6, wherein, the other terminal of the spacer is extended toward and inside the second concave slot.

8. The display panel according to claim 5, wherein, the first sealant coating area is rectangular, frame-shaped and including four coating regions connected with each other; each coating region is provided with the spacer.

9. The display panel according to claim 8, wherein, each coating region is provided with multiple spacers.

10. The display panel according to claim 5, wherein, the spacer is made of a photoresist material, and is formed on the first substrate by steps of developing, exposing and etching.

11. A display device, comprising:
    a display panel including:
        a first substrate, including a first sealant coating area, wherein the first sealant coating area is provided with a first concave slot;
        a second substrate, disposed oppositely to the first substrate, and including a second sealant coating area disposed right oppositely to the first sealant coating area;
        a spacer, the spacer having two terminals, wherein, one terminal of the spacer is fixed to and connected with a bottom of the first concave slot, and the other terminal of the spacer is extended toward the second sealant coating area; and
        a frame sealant, filled between the first sealant coating area and the second sealant coating area in order to form a sealed liquid crystal filling area;
    wherein, a preset gap is existed between the spacer and the second substrate, and the other terminal of the spacer has a concave and convex structure.

12. The display device according to claim 11, wherein, the first concave slot is continuously or discontinuously disposed on the first sealant coating area, and a width of the first concave slot is smaller than a width of the first sealant coating area.

13. The display device according to claim 12, wherein, the second sealant coating area is provided with a second concave slot; the second concave slot is continuously or discontinuously disposed on the second sealant coating area; a width of the second concave slot is smaller than a width of the second sealant coating area; the other terminal of the spacer is extended toward and inside the second concave slot.

14. The display device according to claim 12, wherein, the first sealant coating area is rectangular, frame-shaped and including four coating regions connected with each other; each coating region is provided with the spacer; each coating region is provided with multiple spacers.

15. The display device according to claim 12, wherein, the spacer is made of a photoresist material, and is formed on the first substrate by steps of developing, exposing and etching.

* * * * *